(12) United States Patent
Tan et al.

(10) Patent No.: US 12,311,849 B2
(45) Date of Patent: May 27, 2025

(54) EXTERIOR TRIMMING PART FOR PILLAR OF VEHICLE

(71) Applicant: SAINT-GOBAIN GLASS FRANCE, Courbevoie (FR)

(72) Inventors: Jun Tan, Shanghai (CN); Xiaofeng Guo, Shanghai (CN); Michael Labrot, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 1119 days.

(21) Appl. No.: 17/047,287

(22) PCT Filed: Aug. 30, 2019

(86) PCT No.: PCT/CN2019/103521
§ 371 (c)(1),
(2) Date: Oct. 13, 2020

(87) PCT Pub. No.: WO2020/048390
PCT Pub. Date: Mar. 12, 2020

(65) Prior Publication Data
US 2021/0146860 A1    May 20, 2021

(30) Foreign Application Priority Data

Sep. 3, 2018 (CN) .......................... 201811022019.0

(51) Int. Cl.
*B60R 13/04* (2006.01)
*B60Q 1/38* (2006.01)
(Continued)

(52) U.S. Cl.
CPC ............... *B60R 13/04* (2013.01); *B60Q 1/38* (2013.01); *B60Q 1/5035* (2022.05);
(Continued)

(58) Field of Classification Search
CPC ............... B60R 13/04; B60R 11/0229; B60R 2011/0022; B60R 11/04; B60R 2011/004;
(Continued)

(56) References Cited

U.S. PATENT DOCUMENTS 8,400,265 B2 * 3/2013 Sarioglu ................. E05B 17/10
340/5.72
9,802,554 B1 * 10/2017 Schulze zur Wiesche ..................
B29C 45/0025
(Continued)

FOREIGN PATENT DOCUMENTS

CN         105764751 A        7/2016
CN         106043144 A        10/2016
(Continued)

OTHER PUBLICATIONS

International Search Report as issued in International Patent Application No. PCT/CN2019/103521, dated Nov. 27, 2019.
(Continued)

*Primary Examiner* — Paul N Dickson
*Assistant Examiner* — Sara Laghlam
(74) *Attorney, Agent, or Firm* — Pillsbury Winthrop Shaw Pittman LLP

(57) ABSTRACT

An exterior trimming part for a pillar of a vehicle, includes a bracket fixedly connected to the pillar, and a glass cover plate fixedly connected to the bracket and covering an exterior surface of the bracket. The bracket has a receiving space opened at least towards the glass cover plate. The exterior trimming part further includes an electronic component disposed at the receiving space. The exterior trimming part not only has good scratch resistance, but also has intelligent functions.

5 Claims, 4 Drawing Sheets

(51) Int. Cl.
    *B60Q 1/50*           (2006.01)
    *B60R 11/02*          (2006.01)
    *B60R 11/04*          (2006.01)
    *B60R 11/00*          (2006.01)

(52) U.S. Cl.
    CPC .......... *B60R 11/0229* (2013.01); *B60R 11/04* (2013.01); *B60R 2011/004* (2013.01)

(58) Field of Classification Search
    CPC ..... B60R 11/0235; B60R 25/23; B60R 25/24; B62D 25/04; E05B 17/10; F21S 41/50; F21S 41/55
    See application file for complete search history.

(56) References Cited

U.S. PATENT DOCUMENTS

| | | | | |
|---|---|---|---|---|
| 10,322,754 | B2* | 6/2019 | Salter | B60R 13/04 |
| 10,351,099 | B2* | 7/2019 | Liubakka | H01Q 1/2291 |
| 10,533,350 | B2* | 1/2020 | Schatz | E05B 85/10 |
| 11,131,117 | B2* | 9/2021 | Shah | H03K 17/94 |
| 2015/0114533 | A1* | 4/2015 | Peries | B60J 11/08 |
| | | | | 150/168 |
| 2017/0139506 | A1* | 5/2017 | Rodríguez | G06F 3/041 |
| 2018/0062649 | A1* | 3/2018 | Salter | B60R 25/23 |
| 2021/0146860 | A1* | 5/2021 | Tan | B60R 11/04 |

FOREIGN PATENT DOCUMENTS

| | | | |
|---|---|---|---|
| CN | 206485309 U | | 9/2017 |
| CN | 207173457 U | | 4/2018 |
| CN | 209666992 U | * | 11/2019 |
| EP | 2 930 062 A1 | | 10/2015 |
| GB | 2283375 B | | 12/1997 |
| JP | 2001-303819 A | | 10/2001 |
| JP | 2004-331883 A | | 11/2004 |
| JP | 2010-007357 A | | 1/2010 |
| JP | 2010-036869 A | | 2/2010 |
| JP | 2016-179752 A | | 10/2016 |
| WO | WO-2017158031 A1 | * | 9/2017 ........... B32B 17/064 |

OTHER PUBLICATIONS

First Office Action as issued in Chinese Patent Application No. 201811022019.0, dated May 6, 2023.
Notice of Reasons for Refusal as issued in Japanese Patent Application No. 2020-559433, dated Jun. 20, 2023.
Notice of Reasons for Refusal as issued in Japanese Patent Application No. 2020-559433, dated Dec. 5, 2023.

* cited by examiner

EXTERIOR TRIMMING PART FOR PILLAR OF VEHICLE

CROSS-REFERENCE TO RELATED APPLICATIONS

This application is the U.S. National Stage of PCT/CN2019/103521, filed Aug. 30, 2019, which in turn claims priority to Chinese patent application number 201811022019.0 filed Sep. 3, 2018. The content of these applications are incorporated herein by reference in their entireties.

TECHNICAL FIELD

The present disclosure generally relates to the field of production of vehicle components, and more particularly to an exterior trimming part for a pillar of a vehicle.

BACKGROUND

A vehicle typically includes pillars, such as A-pillars, B-pillars, and C-pillars, and the side of each pillar facing the exterior of the vehicle is typically provided with an exterior trimming part. A conventional exterior trimming part is generally made of plastic material, such as PC (polycarbonate) and PMMA (polymethyl methacrylate), by injection molding. However, the user's requirement on the appearance of the vehicle cannot usually be satisfied, since plastic material has poor scratch resistance. Some solutions have been proposed to solve this problem in the art. One solution is to use glass to form the exterior surface of the exterior trimming part, since glass naturally has good scratch resistance and thus can perfectly solve the problem of the appearance of the exterior trimming part.

However, as the intelligent level of vehicle continues to increase, in addition to the appearance requirement, whether it is possible to make the exterior trimming parts have certain intelligent functions has become a research and development interest of practitioners.

SUMMARY

The present disclosure aims to provide an exterior trimming part for a pillar of a vehicle that not only has good scratch resistance but also has additional intelligent functions.

The exterior trimming part of the present disclosure comprises: a bracket fixedly connected to the pillar; and a glass cover plate fixedly connected to the bracket and covering an exterior surface of the bracket. The bracket comprises a receiving space opened at least towards the glass cover plate, and the exterior trimming part further comprises an electronic component disposed at the receiving space.

In the context of the present disclosure, "exterior surface" refers to a surface of a component facing the exterior of the vehicle, unless otherwise indicated. The present disclosure does not limit the extension curvature of the glass cover plate. That is, the glass cover plate may be a flat glass or a curved glass. The receiving space in the present disclosure should be opened at least towards the glass cover plate. Since the glass cover plate does not interfere with the function of the electronic component, such a structure can ensure that the function of the electronic component can be realized. In the present disclosure, there is no limitation on whether the receiving space is opened towards other directions. For instance, the receiving space may also be opened towards the pillar of the vehicle at the same time, thereby forming a through-hole structure in the bracket.

Preferably, the electronic component is a touch screen, a display screen or a touch and display screen and may be configured to be activated when the vehicle detects that a vehicle key enters into a preset range, which makes it convenient for the user to use, reduces power consumption, and avoids falsely triggering by a person or an object other than the legitimate user in the case that the electronic component is a touch screen or a touch and display screen.

Preferably, the electronic component is a camera or a radar sensor, and may be communicatively connected to an automatic or a semi-automatic driving system of the vehicle to provide environmental information sensed at the pillar to the automatic or semi-automatic driving system in real time. In the case of using the camera, the camera provides image information of the surroundings captured at the pillar, and the automatic or semi-automatic driving system can further analyze and obtain environmental status near the pillar of the vehicle from the image information. In the case of using the radar sensor, the radar sensor can detect positions of obstacles near the pillar of the vehicle and report them to the automatic or semi-automatic driving system.

It can be readily understood that, in the case that the electronic component is the display screen, the touch and display screen or the camera and most area of the glass cover plate has a certain haze, is colored, or is coated with an ink layer, an area of the glass cover plate corresponding to the position of the electronic component needs to partially remain colorless and transparent, so as to ensure display effect or image capturing performance of the electronic component.

Preferably, the electronic component is a lamp assembly. The lamp assembly is configured to form a decorative pattern or an indicative pattern when illuminated; alternatively, the glass cover plate comprises a surface facing towards the bracket, on which a zone corresponding to a position of the lamp assembly is coated with an ink layer to form a pattern complementary to the decorative pattern or to the indicative pattern. In the latter case, the lamp assembly itself does not need to form any particular pattern, as long as its illumination area can cover the decorative pattern or indicative pattern. Thereby, once the lamp assembly is illuminated, the area of the glass cover plate coated with the ink layer would block light originating from the lamp assembly and prevent it from being transmitted through the glass cover plate, while the area of the glass cover plate not coated with the ink layer would allow light originating from the lamp assembly to be transmitted through the glass cover plate, thereby enabling the user to observe the illuminated decorative pattern or indicative pattern from the exterior of the vehicle.

Preferably, an exterior surface of the glass cover plate is coated with a water repellent layer. The water repellent layer can prevent rainwater or condensed water from staying on the surface of the glass cover plate. In the case that the electronic component is a touch screen, this would prevent rainwater or condensed water from lowering the sensitivity of the touch screen. In the case that the electronic component is a camera or radar sensor, this will prevent rainwater or condensed water from affecting the sharpness of the images captured by the camera or the accuracy of the detection results of the radar sensor. In the case that the electronic component is a lamp assembly, this will prevent rainwater or condensed water from affecting the lighting effect of the decorative pattern or indicative pattern.

Preferably, the electronic component is fixed at the receiving space by an adhesive or welding.

Preferably, the bracket is integrally injection-molded by encapsulation and fixedly connected to the glass cover plate; alternatively, the bracket and the glass cover plate are fixedly connected by an adhesive and/or a snap fit. In the case of injection molding by encapsulation, the glass cover plate is fabricated in advance and then placed at a predetermined position in an injection mold cavity for forming the bracket; then injection-molding material is injected into the injection mold cavity; when injection molding is finished, the bracket is molded and at the same time fixedly connected to the glass cover plate. If the bracket is connected to the glass cover plate by other ways, the bracket may not be made of injection-molding material, and the bracket may be fabricated by CNC (Computer Numerical Control) technology.

Preferably, the glass cover plate is a tempered glass or a laminated glass.

BRIEF DESCRIPTION OF THE DRAWINGS

The accompanying drawings, which are included to provide a further understanding of the present disclosure and constitute a part of this specification, are intended to illustrate the present disclosure together with the embodiments below and do not limit the present disclosure. In the drawings.

It should be understood that the drawings are not to drawn scale.

DETAILED DESCRIPTION OF THE INVENTION

Embodiment 1

Figure 1:
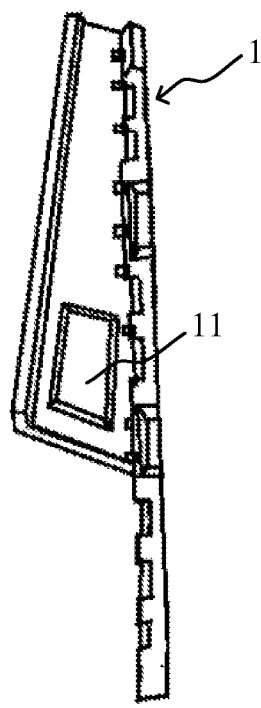
FIG. 1 is a schematic view of a bracket in Embodiment 1 of the present disclosure.
Figure 2:
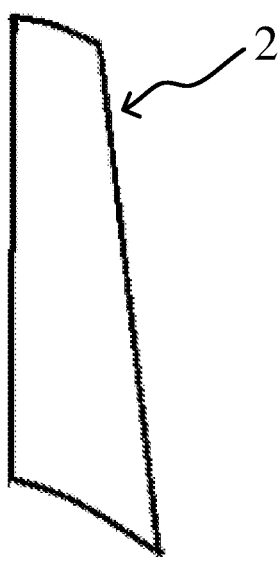
FIG. 2 is a schematic view of a glass cover plate in Embodiment 1 of the present disclosure.

Referring to FIGS. 1-4, the present embodiment provides an exterior trimming part for a B-pillar of a vehicle having a camera. FIG. 1 shows a bracket 1 of the exterior trimming part. In a mounted state of the bracket 1, a side of the bracket 1 facing the interior of the vehicle is fixedly connected to the B-pillar, and a side of the bracket 1 facing the exterior of the vehicle is substantially covered by a glass cover plate 2 shown in FIG. 2. Thereby, the glass cover plate 2 forms a decorative surface of the exterior trimming part.

Figure 3:
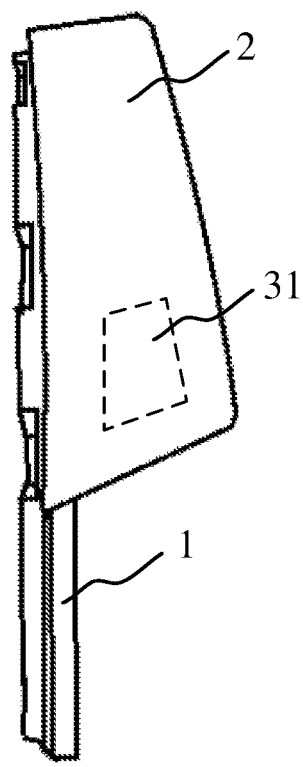
FIG. 3 is a schematic view of the bracket and the glass cover plate in an assembled state in Embodiment 1 of the present disclosure.
Figure 4:
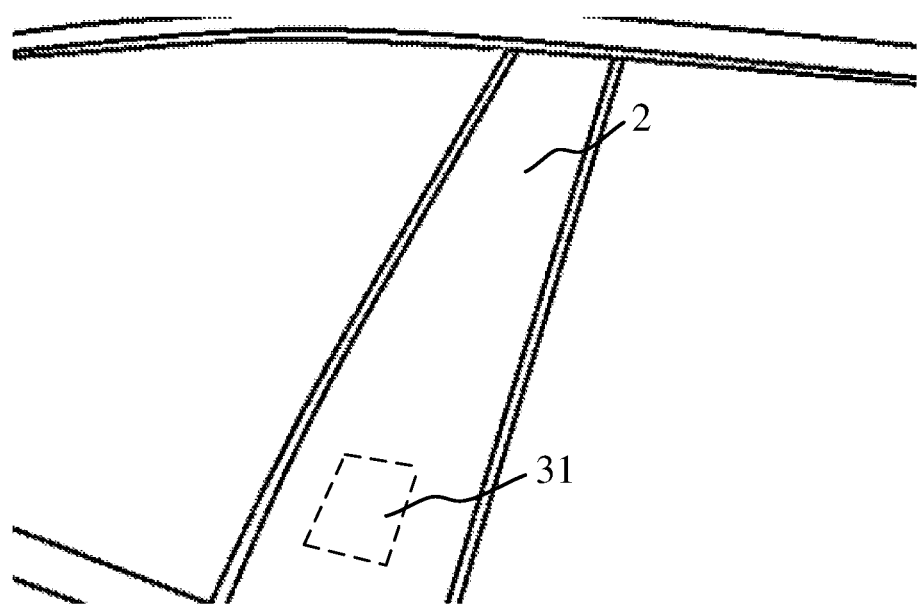
FIG. 4 is a schematic view of an exterior trimming part in Embodiment 1 of the present disclosure mounted to a B-pillar of a vehicle.

Still referring to FIG. 1, the bracket 1 is provided with a receiving hole 11 for mounting a camera 31. However, in the state shown in FIG. 1, the camera 31 has not been mounted. In the state shown in FIG. 3, the camera 31 has been mounted at the receiving hole 11 and the bracket 1 has been assembled with the glass cover plate 2, thus the fabrication of the exterior trimming part is completed. FIG. 4 is a schematic view of the exterior trimming part mounted to the B-pillar of the vehicle. In FIGS. 3 and 4, the camera is indicated by a dashed line, since the camera is not directly exposed at the outermost side of the exterior trimming part, but is covered by the glass cover plate 2 and is visible through the glass cover plate 2.

The vehicle includes an automatic or semi-automatic driving system, and the driving system is communicatively connected to the camera 31. Thereby, the camera can take images of the environment near the B-pillar under the control of the driving system, and these images are provided to the driving system for analyzing and obtaining real-time environmental status near the B-pillar.

In this embodiment, the camera 31 is fixed at the receiving hole 11 by an adhesive, but it may also be fixed at the receiving hole 11 by welding.

In this embodiment, the bracket 1 is integrally injection-molded with the glass cover plate 2 by encapsulation. Specifically, the glass cover plate 2 is fabricated in advance and then placed at a predetermined position in an injection mold cavity. Then, plastic material is injected into the injection mold cavity to form the bracket 1. Once the bracket 1 is molded, it is fixedly connected to the glass cover plate 2. Thereafter, the camera 31 is mounted at the receiving hole 11.

However, the way for mounting the glass cover plate 2 to the bracket 1 is not limited to injection molding by encapsulation. The following way may also be used. The bracket 1 may be fabricated in advance by injection molding or CNC, and the glass cover plate 2 may be separately fabricated. Then the bracket 1 may be assembly with the glass cover plate 2 by an adhesive and/or a snap-fit. The mounting of the camera 31 can be performed either before or after the assembly of the bracket 1 and the glass cover plate 2.

In the present embodiment, the glass cover plate 2 is made of tempered glass. The glass cover plate 2 may be also made of laminated glass. It can be readily understood that, when the glass cover plate 2 has a certain haze, is colored or is coated with an ink layer, the area of the glass cover plate 2 corresponding to the position of the camera 31 needs to remain colorless and transparent, so as to ensure the image capturing performance of the camera 31.

In the present embodiment, the material of the bracket 1 is ABS (terpolymer of acrylonitrile, butadiene and styrene). However, the material of the bracket 1 may also be, for instance, PP (polypropylene), PC, PA6 (polyamide 6), the combination of PA66 (polyamide 66) and GF (glass fiber), PVC (polyvinyl chloride) or TPE (thermoplastic elastomer), etc. In this embodiment, the exterior trimming part is mounted at the B-pillar, but it may also be mounted at other pillars of the vehicle.

Embodiment 2

This embodiment provides another exterior trimming part, which differs from Embodiment 1 only in that the camera in Embodiment 1 is replaced by a radar sensor. The radar sensor can detect positions of objects near the B-pillar and reporting this information to the automatic or semi-automatic driving system of the vehicle.

Embodiment 3

Figure 5:
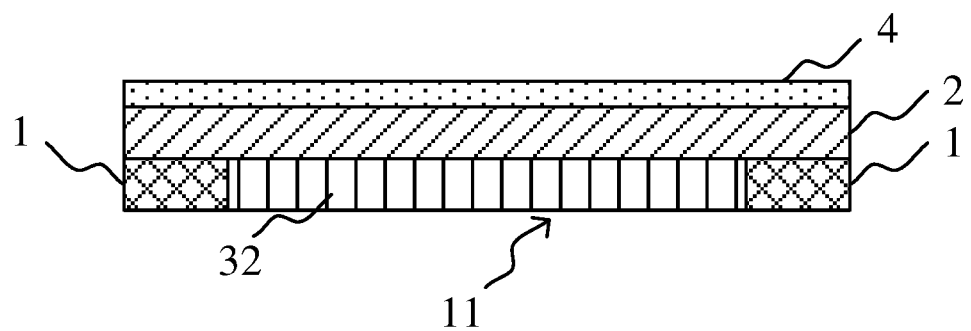
FIG. 5 is a schematic sectional view of an exterior trimming part in Embodiment 3 of the present disclosure.

Referring to FIG. 5, this embodiment provides another exterior trimming part, which differs from Embodiment 1 firstly in that the camera in Embodiment 1 is replaced by a touch screen 32. The touch screen is a capacitive touch screen, but it may also be a resistive touch screen or other touch screen of known structure.

The touch screen is in a closed or hibernation state by default in the case that the vehicle is locked. The vehicle in this embodiment has a vehicle-key detection function. Once it is detected that the vehicle key enters into a preset range, a control system of the vehicle activates the touch screen, so that the user can operate the touch screen 32 to accomplish actions, such as implementing fingerprint authentication or opening a vehicle door, when approaching the B-pillar.

This embodiment is not limited to the use of the touch screen, and the touch screen may be replaced by a display screen or a touch and display screen to achieve certain display function. It can be readily understood that, when the glass cover plate 2 has a certain haze, is colored or is coated with an ink layer, the area of the glass cover plate 2 corresponding to the position of the display screen or the touch and display screen needs to remain colorless and transparent, so as to ensure good image display performance.

Still referring to FIG. 5, on the basis of Embodiment 1, the exterior surface of the glass cover plate 2 is coated with a water repellent layer 4 in this embodiment. The water repellent layer 4 can prevent rainwater or condensed water from staying on the exterior surface of the glass cover plate 2 so as to ensure the sensitivity of the touch screen 32.

The water repellent layer 4 can not only be applied to the present embodiment, but also applied to other embodiments in the present application, so as to prevent rainwater or condensed water from interfering with or affecting good operation of the electronic component mounted at the receiving hole 11.

Embodiment 4

Figure 6:
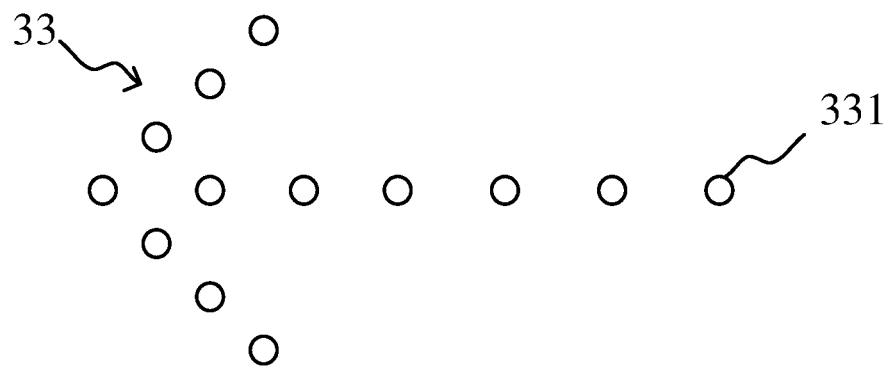
FIG. 6 is a schematic view of a lamp assembly in Embodiment 4 of the present disclosure.

As shown in FIG. 6, this embodiment provides another exterior trimming part, which differs from Embodiment 1 only in that: the camera 31 in Embodiment 1 is replaced by a lamp assembly 33. The light assembly 33 includes a plurality of LEDs 331, and the bracket 1 has a plurality of receiving holes 11 for mounting the LEDs respectively. In this embodiment, the LEDs 331 are arranged to form an indicative arrow shape. However, for instance, an LED matrix may also be used, and a portion of the LEDs are selectively illuminated by a control circuit of the LED matrix to form various variable indicative patterns or decorative patterns. This embodiment is not limited to the use of LEDs, and other light sources may be used to form the lamp assembly 33.

Embodiment 5

Figure 7:
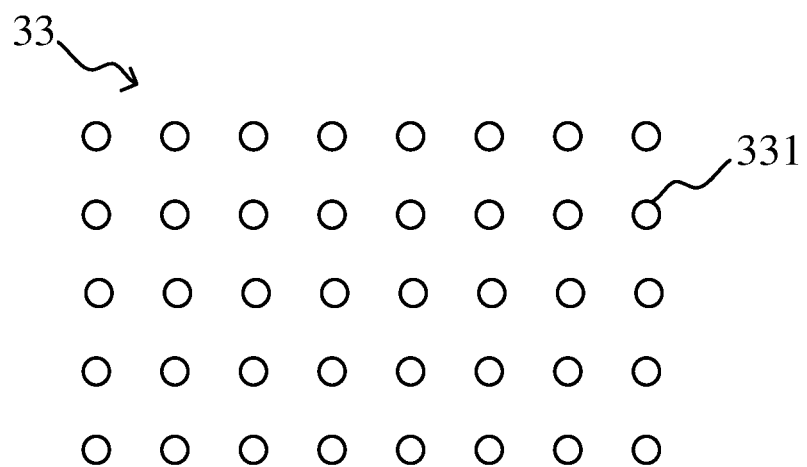
FIG. 7 is a schematic view of a lamp assembly in Embodiment 5 of the present disclosure.
Figure 8:
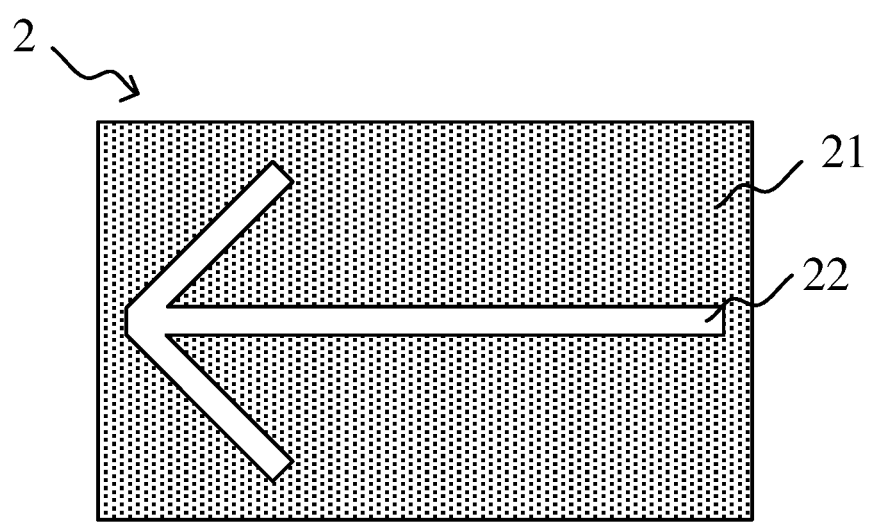
FIG. 8 is a schematic view of a glass cover plate coated with an ink layer in Embodiment 5 of the present disclosure.

As shown in FIG. 7 and FIG. 8, this embodiment provides another exterior trimming part, which differs from Embodiment 6 only in that: the LEDs does not need to be arranged in any particular pattern, for instance, a LED matrix may be directly used as shown in FIG. 7; further, the inner surface of the glass cover plate 2 facing the bracket 1 is coated with an ink layer, and the coverage area of the ink layer should at least include an area corresponding to the light-emitting area of the LED matrix, particularly the ink layer has a shape complementary to an arrow shape (referring to FIG. 8). Thus, when light emitted by the LED matrix reaches the glass cover plate 2, the area 21 with the ink layer prevents the light from being transmitted through the glass cover plate 2 and the area 22 without ink layer allows the light to pass therethrough, so that the illuminated arrow shape can be observed when the B-pillar is observed from the exterior of the vehicle.

In addition, when the LED matrix itself is an integrated LED module, the embodiment may only provide one receiving hole 11 matched with the LED module in size, so that the LED module may be mounted as an integrated component at the receiving hole 11.

It would be appreciated by those skilled in the art that modifications may be made to the above-described embodiments without departing from the inventive concept thereof. Therefore, it is understood that the present disclosure is not limited to the specific embodiments disclosed and is intended to cover modifications within the spirit and scope of the present disclosure defined by the appended claims.

The invention claimed is:

1. An exterior trimming part for a pillar of a vehicle, comprising:
    a bracket fixedly connected to the pillar; and
    a glass cover plate fixedly connected to the bracket and covering an exterior surface of the bracket;
    wherein the bracket comprises a receiving space opened at least towards the glass cover plate, and the exterior trimming part further comprises an electronic component disposed at the receiving space, and
    wherein the electronic component is a lamp assembly, the glass cover plate comprises an inner surface facing towards the bracket, said inner surface of the glass cover plate having a zone, corresponding to a position of the lamp assembly, that is coated with an ink layer to form a pattern complementary to a decorative pattern or to an indicative pattern formed by the lamp assembly when illuminated.

2. The exterior trimming part according to claim 1, wherein an exterior surface of the glass cover plate is coated with a water repellent layer.

3. The exterior trimming part according to claim 1, wherein the electronic component is fixed at the receiving space by an adhesive or by welding.

4. The exterior trimming part according to claim 1, wherein the bracket is integrally injection-molded by encapsulation and fixedly connected to the glass cover plate; alternatively, the bracket and the glass cover plate are fixedly connected by an adhesive and/or a snap fit.

5. The exterior trimming part according to claim 1, wherein the glass cover plate is a tempered glass or a laminated glass.

* * * * *